US012627057B2

(12) United States Patent
Kawabe

(10) Patent No.: US 12,627,057 B2
(45) Date of Patent: May 12, 2026

(54) ELECTRONIC DEVICE AND MULTILAYER SUBSTRATE

(71) Applicant: Murata Manufacturing Co., Ltd., Nagaokakyo (JP)

(72) Inventor: Kentaro Kawabe, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 37 days.

(21) Appl. No.: 18/985,110

(22) Filed: Dec. 18, 2024

(65) Prior Publication Data

US 2025/0118897 A1 Apr. 10, 2025

Related U.S. Application Data

(63) Continuation of application No. PCT/JP2023/017489, filed on May 9, 2023.

(30) Foreign Application Priority Data

Jun. 23, 2022 (JP) ................................ 2022-100859

(51) Int. Cl.
*H01Q 9/04* (2006.01)
*H01Q 1/48* (2006.01)

(52) U.S. Cl.
CPC ............. *H01Q 9/0414* (2013.01); *H01Q 1/48* (2013.01)

(58) Field of Classification Search
CPC ..... H01Q 9/0407; H01Q 9/0414–0457; H01Q 1/2283; H01Q 1/38; H01Q 1/48; H01Q 1/52; H01Q 5/378–392; H01Q 21/065
See application file for complete search history.

(56) References Cited

U.S. PATENT DOCUMENTS 11,276,926 B2 * 3/2022 Yun ........................ H01Q 1/243
11,329,381 B2 * 5/2022 Lee ...................... H01Q 21/065
11,545,761 B2 * 1/2023 He ....................... H01Q 25/001
2021/0367358 A1 11/2021 He et al.

FOREIGN PATENT DOCUMENTS

JP 4569760 B2 10/2010
WO 2020/217689 A1 10/2020
WO 2021/059738 A1 4/2021
WO 2022/064864 A1 3/2022

OTHER PUBLICATIONS

International Search Report and Written Opinion mailed on Jul. 25, 2023, received for PCT Application PCT/JP2023/017489, filed on May 9, 2023, 11 pages including English Translation.

* cited by examiner

*Primary Examiner* — Hasan Islam
(74) *Attorney, Agent, or Firm* — XSENSUS LLP

(57) ABSTRACT

A first radiation conductor layer is provided in a multilayer body. A second radiation conductor layer is provided in or on the multilayer body, is located above the first radiation conductor layer, and overlaps the first radiation conductor layer when viewed in an up-down direction. A first floating conductor has a shape surrounding at least a part of a periphery of the first radiation conductor layer when viewed in the up-down direction, is located on a same layer as or above the first radiation conductor layer and on a same layer as or below the second radiation conductor layer in the up-down direction, and is not electrically connected to any conductor present in or on the multilayer body. A second floating conductor has a shape surrounding at least a part of a periphery of the second radiation conductor layer.

20 Claims, 6 Drawing Sheets

ELECTRONIC DEVICE AND MULTILAYER SUBSTRATE

CROSS-REFERENCE TO RELATED APPLICATIONS

This is a continuation application of PCT/JP2023/017489, filed on May 9, 2023, designating the United States of America, which is based on and claims priority to Japanese Patent Application No. JP 2022-100859 filed on Jun. 23, 2022. The entire contents of the above-identified applications, including the specifications, drawings and claims, are incorporated herein by reference in their entirety.

TECHNICAL FIELD

The present disclosure relates to an electronic device and multilayer substrate having a plurality of radiation conductor layers.

BACKGROUND ART

An antenna device described in Patent Document 1 is known as an disclosure relating to an electronic device in the related art. The antenna device includes a patch antenna, a cushion member, and a metal ring. The cushion member is located above the patch antenna. The metal ring is located above the cushion member. The metal ring has an annular shape when viewed in an up-down direction. The metal ring and the cushion member form a waveguide. Such a configuration improves the directivity of the patch antenna.

CITATION LIST

Patent Document

Patent Document 1: Japanese Patent No. 4569760

SUMMARY OF DISCLOSURE

Technical Problem

In the antenna device described in Patent Document 1, when the antenna device includes a plurality of patch antennas, there is a desire to improve the directivity of each of the plurality of patch antennas.

Therefore, it is a feature of the present disclosure to improve, in an electronic device and a multilayer substrate having a plurality of radiation conductor layers, the directivity of each of the plurality of radiation conductor layers.

Solution to Problem

An electronic device according to an aspect of the present disclosure includes:

- a multilayer substrate; and
- a second floating conductor,
- in which the multilayer substrate includes:
  - a multilayer body having a structure in which a plurality of insulator layers is stacked in an up-down direction;
  - a first radiation conductor layer provided in the multilayer body;
  - a second radiation conductor layer that is provided in or on the multilayer body, that is located above the first radiation conductor layer, and that overlaps the first radiation conductor layer when viewed in the up-down direction; and
  - a first floating conductor that has a shape surrounding at least a part of a periphery of the first radiation conductor layer when viewed in the up-down direction, that is located on a same layer as or above the first radiation conductor layer and on a same layer as or below the second radiation conductor layer in the up-down direction, and that is not electrically connected to any conductor present in or on the multilayer body, and
- in which the second floating conductor is not electrically connected to any conductor present in or on the multilayer body, has a shape surrounding at least a part of a periphery of the second radiation conductor layer when viewed in the up-down direction, and is located above the second radiation conductor layer.

A multilayer substrate according to an aspect of the present disclosure includes:

- a multilayer body having a structure in which a plurality of insulator layers is stacked in an up-down direction;
- a first radiation conductor layer provided in the multilayer body;
- a second radiation conductor layer that is provided in or on the multilayer body, that is located above the first radiation conductor layer, and that overlaps the first radiation conductor layer when viewed in the up-down direction;
- a first floating conductor that has a shape surrounding at least a part of the first radiation conductor layer when viewed in the up-down direction, that is located on a same layer as or above the first radiation conductor layer and on a same layer as or below the second radiation conductor layer in the up-down direction, and that is not electrically connected to any conductor present in or on the multilayer body; and
- a second floating conductor that has a shape surrounding at least a part of the second radiation conductor layer when viewed in the up-down direction, that is located above the second radiation conductor layer, and that is not electrically connected to any conductor present in or on the multilayer body.

Advantageous Effects of Disclosure

According to the present disclosure, in an electronic device and a multilayer substrate having a plurality of radiation conductor layers, the directivity of each of the plurality of radiation conductor layers can be improved.

DESCRIPTION OF EMBODIMENTS

Embodiments

[Structure of Electronic Device 1]

Figure 1:
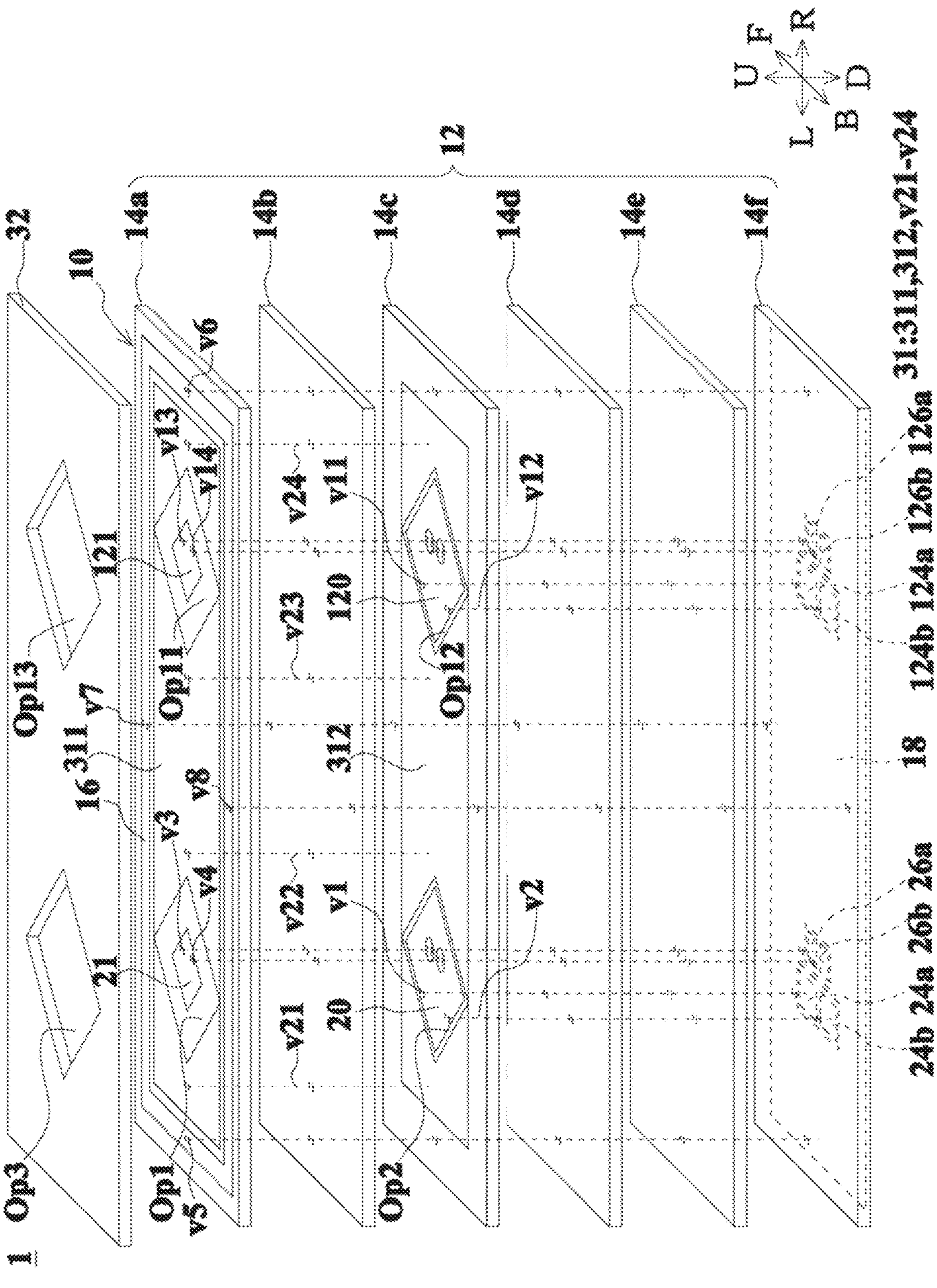
FIG. 1 is an exploded perspective view of an electronic device 1.
Figure 2:
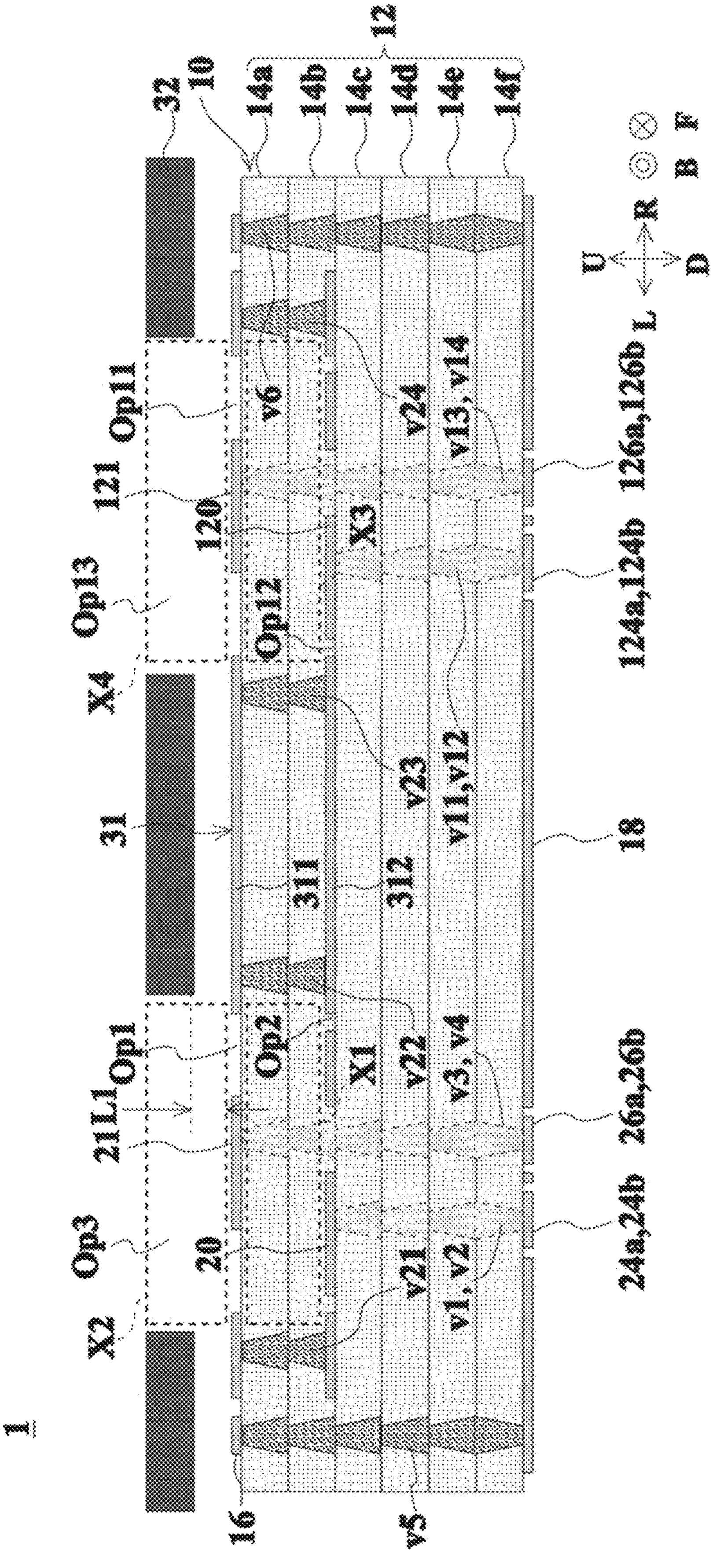
FIG. 2 is a cross-sectional view of the electronic device 1 of FIG. 1.
Figure 3:
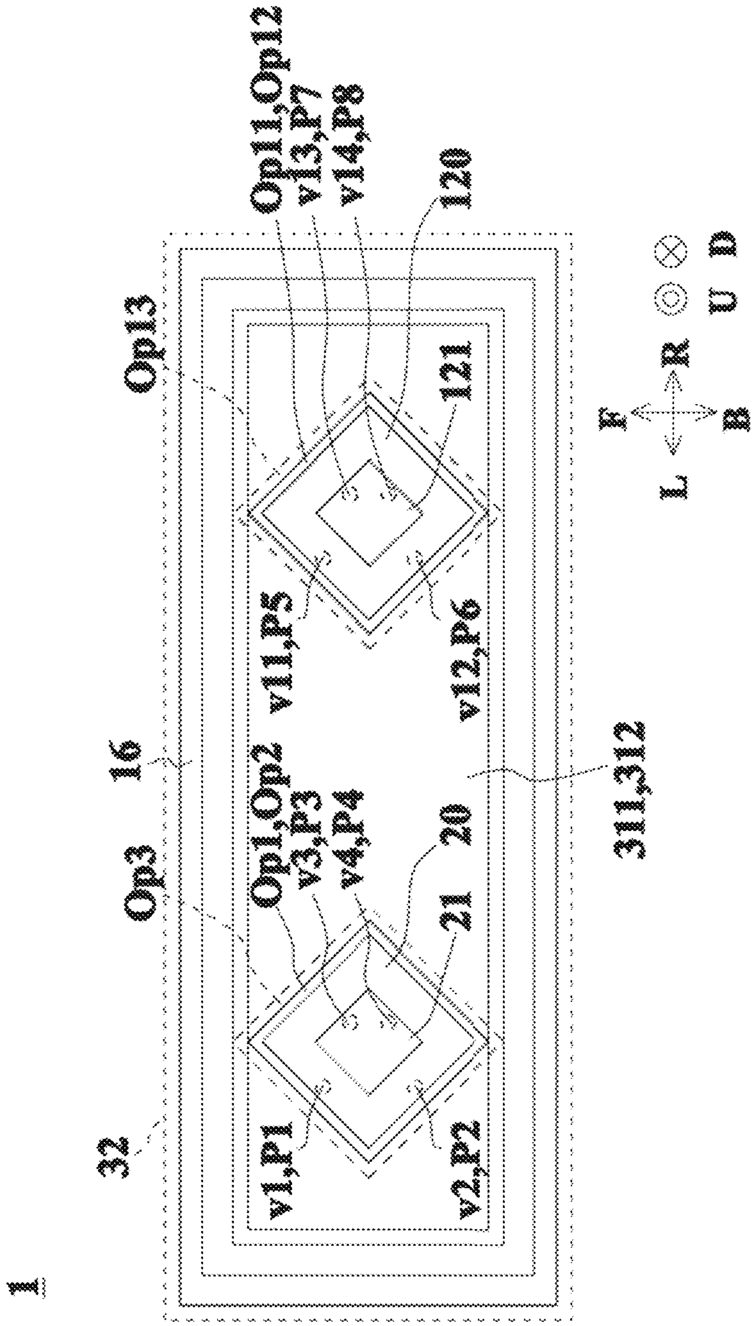
FIG. 3 is a transparent view of the electronic device 1 when viewed from above.

The structure of an electronic device 1 according to an embodiment of the present disclosure will be described below with reference to the drawings. FIG. 1 is an exploded perspective view of the electronic device 1. FIG. 2 is a cross-sectional view of the electronic device 1 of FIG. 1. FIG. 3 is a transparent view of the electronic device 1 when viewed from above.

Hereinafter, the stacking direction of a multilayer body 12 of the electronic device 1 is defined as an up-down direction. When the multilayer body 12 is viewed in the up-down direction, two directions in which the sides of the multilayer body 12 extend are defined as a left-right direction and a front-back direction, respectively. The left-right direction is perpendicular to the up-down direction. The front-back direction is perpendicular to the up-down direction and the left-right direction. The definition of the directions in the present description is only an example. Therefore, it is not necessary that the directions in actual use of the electronic device 1 coincide with the directions in the present description. Further, the up-down direction may be reversed in each drawing. Similarly, the left-right direction may be reversed in each drawing, and the front-back direction may be reversed in each drawing.

Hereinafter, X is a component or member of the electronic device 1. In the present description, unless otherwise noted, each portion of X is defined as follows. A front portion of X means the front half of X. A back portion of X means the back half of X. A left portion of X means the left half of X. A right portion of X means the right half of X. An upper portion of X means the upper half of X. A lower portion of X means the lower half of X. A front end of X means an end of X in the front direction. A back end of X means an end of X in the back direction. A left end of X means an end of X in the left direction. A right end of X means an end of X in the right direction. An upper end of X means an end of X in the up direction. A lower end of X means an end of X in the down direction. A front-end portion of X means the front end of X and its vicinity. A back-end portion of X means the back end of X and its vicinity. A left-end portion of X means the left end of X and its vicinity. A right-end portion of X means the right end of X and its vicinity. An upper-end portion of X means the upper end of X and its vicinity. A lower-end portion of X means the lower end of X and its vicinity.

The electronic device 1 is, for example, a wireless communication terminal such as a smartphone. As shown in FIG. 1, the electronic device 1 includes a multilayer substrate 10 and a second floating conductor 32. In addition to the multilayer substrate 10 and the second floating conductor 32, the electronic device 1 also includes a casing, a display device, a battery, and the like. However, the casing, the display device, the battery, and the like are not shown.

As shown in FIG. 1, the multilayer substrate 10 includes the multilayer body 12, a first ground conductor layer 16, a planar ground conductor layer 18, a first radiation conductor layer 20, a second radiation conductor layer 21, outer electrodes 24*a*, 24*b*, 26*a*, 26*b*, 124*a*, 124*b*, 126*a*, and 126*b*, a first floating conductor 31, a third radiation conductor layer 120, a fourth radiation conductor layer 121, and interlayer connection conductors v1 to v8 and v11 to v14.

The multilayer body 12 has a plate shape. As shown in FIGS. 1 and 2, the multilayer body 12 has a rectangular shape when viewed in the up-down direction. The multilayer body 12 has a structure in which insulator layers 14*a* to 14*f* are stacked in the up-down direction. The insulator layers 14*a* to 14*f* are arranged in this order from top to bottom. The material of the insulator layers 14*a* to 14*f* is a thermoplastic resin such as polyimide, liquid crystal polymer, or the like. Therefore, the multilayer body 12 is flexible.

The first radiation conductor layer 20 radiates and/or receives a first high-frequency signal. The first radiation conductor layer 20 is provided in the multilayer body 12. In the present embodiment, the first radiation conductor layer 20 is located on the upper main surface of the insulator layer 14*c*. As shown in FIG. 1, the first radiation conductor layer 20 has a diamond shape with diagonal lines extending in the front-back direction and the left-right direction when viewed in the up-down direction. The length of one side of the first radiation conductor layer 20 is ½ of the wavelength of the first high-frequency signal.

The second radiation conductor layer 21 radiates and/or receives a second high-frequency signal. The second radiation conductor layer 21 is provided on the multilayer body 12. In the present embodiment, the second radiation conductor layer 21 is located on the upper main surface of the insulator layer 14*a*. Thus, the second radiation conductor layer 21 is located above the first radiation conductor layer 20. The distance between the second radiation conductor layer 21 and the first radiation conductor layer 20 in the up-down direction is ¼ of the wavelength of the second high-frequency signal. The length of one side of the second radiation conductor layer 21 is ½ of the wavelength of the second high-frequency signal.

Further, as shown in FIG. 3, the second radiation conductor layer 21 overlaps the first radiation conductor layer 20 when viewed in the up-down direction. The second radiation conductor layer 21 has a diamond shape with diagonal lines extending in the front-back direction and the left-right direction when viewed in the up-down direction. However, the area of the second radiation conductor layer 21 is smaller than the area of the first radiation conductor layer 20. Therefore, the four sides of the first radiation conductor layer 20 do not overlap the second radiation conductor layer 21 when viewed in the up-down direction. Thus, the frequency of the second high-frequency signal radiated or received by the second radiation conductor layer 21 is higher than the frequency of the first high-frequency signal radiated or received by the first radiation conductor layer 20.

The third radiation conductor layer 120 radiates and/or receives a third high-frequency signal. The third radiation conductor layer 120 is provided in the multilayer body 12. In the present embodiment, the third radiation conductor layer 120 is located on the upper main surface of the insulator layer 14*c*. As shown in FIG. 1, the third radiation conductor layer 120 has a diamond shape with diagonal lines extending in the front-back direction and the left-right direction when viewed in the up-down direction. The length of one side of the third radiation conductor layer 120 is ½ of the wavelength of the third high-frequency signal.

The fourth radiation conductor layer 121 radiates and/or receives a fourth high-frequency signal. The fourth radiation conductor layer 121 is provided on the multilayer body 12. In the present embodiment, the fourth radiation conductor layer 121 is located on the upper main surface of the insulator layer 14*a*. Thus, the fourth radiation conductor layer 121 is located above the third radiation conductor layer 120. The distance between the fourth radiation conductor layer 121 and the third radiation conductor layer 120 in the up-down direction is ¼ of the wavelength of the fourth high-frequency signal. The length of one side of the fourth radiation conductor layer 121 is ½ of the wavelength of the fourth high-frequency signal.

Further, as shown in FIG. 3, the fourth radiation conductor layer 121 overlaps the third radiation conductor layer 120 when viewed in the up-down direction. As shown in FIG. 3, the fourth radiation conductor layer 121 has a diamond shape with diagonal lines extending in the front-back direction and the left-right direction when viewed in the up-down direction. However, the area of the fourth radiation conductor layer 121 is smaller than the area of the third radiation conductor layer 120. Therefore, the four sides of the third radiation conductor layer 120 do not overlap the fourth radiation conductor layer 121 when viewed in the up-down direction. Thus, the frequency of the fourth high-frequency signal radiated or received by the fourth radiation conductor layer 121 is higher than the frequency of the third high-frequency signal radiated or received by the third radiation conductor layer 120.

The planar ground conductor layer 18 is provided on the multilayer body 12 as shown in FIGS. 1 and 2. More specifically, the planar ground conductor layer 18 is located below the first radiation conductor layer 20 and the third radiation conductor layer 120. The planar ground conductor layer 18 is provided on the lower main surface of the insulator layer 14*f*. As shown in FIG. 1, the planar ground conductor layer 18 has a rectangular shape when viewed in the up-down direction. The long side of the planar ground conductor layer 18 extends in the left-right direction. The short side of the planar ground conductor layer 18 extends in the front-back direction. When viewed in the up-down direction, the planar ground conductor layer 18 overlaps the first radiation conductor layer 20, the second radiation conductor layer 21, the third radiation conductor layer 120, and the fourth radiation conductor layer 121. The planar ground conductor layer 18 is connected to a ground potential.

The first ground conductor layer 16 is provided on the multilayer body 12. More specifically, the first ground conductor layer 16 is located above the first radiation conductor layer 20 and the third radiation conductor layer 120. In the present embodiment, the position of the first ground conductor layer 16 in the up-down direction is the same as the positions of the second radiation conductor layer 21 and the fourth radiation conductor layer 121 in the up-down direction. Therefore, the first ground conductor layer 16 is located on the upper main surface of the insulator layer 14*a*.

The first ground conductor layer 16 does not overlap the first radiation conductor layer 20, the second radiation conductor layer 21, the third radiation conductor layer 120, or the fourth radiation conductor layer 121 when viewed in the up-down direction. In the present embodiment, the first ground conductor layer 16 has, when viewed in the up-down direction, an annular shape surrounding the periphery of the first radiation conductor layer 20, the second radiation conductor layer 21, the third radiation conductor layer 120, and the fourth radiation conductor layer 121 when viewed in the up-down direction. In the present embodiment, the first ground conductor layer 16 has an outer edge and an inner edge of a rectangular shape having two sides extending in the front-back direction and two sides extending in the left-right direction.

The outer electrodes 24*a*, 24*b*, 26*a*, 26*b*, 124*a*, 124*b*, 126*a*, and 126*b* are provided on the lower main surface of the insulator layer 14*f*. The outer electrodes 24*a*, 24*b*, 26*a*, 26*b*, 124*a*, 124*b*, 126*a*, and 126*b* are not in contact with the planar ground conductor layer 18. Therefore, the outer electrodes 24*a*, 24*b*, 26*a*, 26*b*, 124*a*, 124*b*, 126*a*, and 126*b* are located within the openings provided in the planar ground conductor layer 18.

The outer electrodes 24*a* and 24*b* overlap the first radiation conductor layer 20 when viewed in the up-down direction. The outer electrodes 26*a* and 26*b* overlap the second radiation conductor layer 21 when viewed in the up-down direction. The first high-frequency signal is input and output to and from the outer electrodes 24*a* and 24*b*. The second high-frequency signal is input and output to and from the outer electrodes 26*a* and 26*b*.

The outer electrodes 124*a* and 124*b* overlap the third radiation conductor layer 120 when viewed in the up-down direction. The outer electrodes 126*a* and 126*b* overlap the fourth radiation conductor layer 121 when viewed in the up-down direction. The third high-frequency signal is input and output to and from the outer electrodes 124*a* and 124*b*. The fourth high-frequency signal is input and output to and from the outer electrodes 126*a* and 126*b*.

As shown in FIG. 3, the interlayer connection conductor v1 electrically connects the first radiation conductor layer 20 and the outer electrode 24*a*. The interlayer connection conductor v1 passes through the insulator layers 14*c* to 14*f* in the up-down direction. The interlayer connection conductor v1 is located in the vicinity of the midpoint of the left front side of the first radiation conductor layer 20 when viewed in the up-down direction. In the first radiation conductor layer 20, a point where the interlayer connection conductor v1 is in contact with the first radiation conductor layer 20 is a first power feeding point P1.

As shown in FIG. 3, the interlayer connection conductor v2 electrically connects the first radiation conductor layer 20 and the outer electrode 24*b*. The interlayer connection conductor v2 passes through the insulator layers 14*c* to 14*f* in the up-down direction. The interlayer connection conductor v2 is located in the vicinity of the midpoint of the left back side of the first radiation conductor layer 20 when viewed in the up-down direction. In the first radiation conductor layer 20, a point where the interlayer connection conductor v2 is in contact with the first radiation conductor layer 20 is a second power feeding point P2.

As shown in FIG. 3, the interlayer connection conductor v3 electrically connects the second radiation conductor layer 21 and the outer electrode 26*a*. The interlayer connection conductor v3 passes through the insulator layers 14*a* to 14*f* in the up-down direction. The interlayer connection conductor v3 is located in the vicinity of the midpoint of the right front side of the second radiation conductor layer 21 when viewed in the up-down direction. In the second radiation conductor layer 21, a point where the interlayer connection conductor v3 is in contact with the second radiation conductor layer 21 is a third power feeding point P3.

As shown in FIG. 3, the interlayer connection conductor v4 electrically connects the second radiation conductor layer 21 and the outer electrode 26*b*. The interlayer connection conductor v4 passes through the insulator layers 14*a* to 14*f* in the up-down direction. The interlayer connection conductor v4 is located in the vicinity of the midpoint of the right back side of the second radiation conductor layer 21 when viewed in the up-down direction. In the second radiation conductor layer 21, a point where the interlayer connection conductor v4 is in contact with the second radiation conductor layer 21 is a fourth power feeding point P4.

As shown in FIG. 3, the interlayer connection conductor v11 electrically connects the third radiation conductor layer 120 and the outer electrode 124*a*. The interlayer connection conductor v11 passes through the insulator layers 14c to 14f in the up-down direction. The interlayer connection conductor v11 is located in the vicinity of the midpoint of the left front side of the third radiation conductor layer 120 when viewed in the up-down direction. In the third radiation conductor layer 120, a point where the interlayer connection conductor v11 is in contact with the third radiation conductor layer 120 is a fifth power feeding point P5.

As shown in FIG. 3, the interlayer connection conductor v12 electrically connects the third radiation conductor layer 120 and the outer electrode 124b. The interlayer connection conductor v12 passes through the insulator layers 14c to 14f in the up-down direction. The interlayer connection conductor v12 is located in the vicinity of the midpoint of the left back side of the third radiation conductor layer 120 when viewed in the up-down direction. In the third radiation conductor layer 120, a point where the interlayer connection conductor v12 is in contact with the third radiation conductor layer 120 is a sixth power feeding point P6.

As shown in FIG. 3, the interlayer connection conductor v13 electrically connects the fourth radiation conductor layer 121 and the outer electrode 126a. The interlayer connection conductor v13 passes through the insulator layers 14a to 14f in the up-down direction. The interlayer connection conductor v13 is located in the vicinity of the midpoint of the right front side of the fourth radiation conductor layer 121 when viewed in the up-down direction. In the fourth radiation conductor layer 121, a point where the interlayer connection conductor v13 is in contact with the fourth radiation conductor layer 121 is a seventh power feeding point P7.

As shown in FIG. 3, the interlayer connection conductor v14 electrically connects the fourth radiation conductor layer 121 and the outer electrode 126b. The interlayer connection conductor v14 passes through the insulator layers 14a to 14f in the up-down direction. The interlayer connection conductor v14 is located in the vicinity of the midpoint of the right back side of the fourth radiation conductor layer 121 when viewed in the up-down direction. In the fourth radiation conductor layer 121, a point where the interlayer connection conductor v14 is in contact with the fourth radiation conductor layer 121 is an eighth power feeding point P8.

The interlayer connection conductors v5 to v8 electrically connect the first ground conductor layer 16 and the planar ground conductor layer 18. Each of the interlayer connection conductors v5 to v8 passes through the insulator layers 14a to 14f in the up-down direction.

The first floating conductor 31 is provided in or on the multilayer body 12. The first floating conductor 31 is located on the same layer as or above the first radiation conductor layer 20 and on the same layer as or below the second radiation conductor layer 21 in the up-down direction.

In the present embodiment, as shown in FIG. 1, the first floating conductor 31 includes an upper floating conductor layer 311, a lower floating conductor layer 312, and interlayer connection conductors v21 to v24. The upper floating conductor layer 311 is located on the upper surface of the multilayer body 12. Therefore, the upper floating conductor layer 311 is located on the upper main surface of the insulator layer 14a. The upper floating conductor layer 311 has a rectangular shape when viewed in the up-down direction. The long side of the upper floating conductor layer 311 extends in the left-right direction. The short side of the upper floating conductor layer 311 extends in the front-back direction.

The upper floating conductor layer 311 is provided with openings Op1 and Op11. The openings Op1 and Op11 are arranged in this order from left to right. The openings Op1 and Op11 each have a diamond shape with diagonal lines extending in the front-back direction and the left-right direction. The entirety of the first radiation conductor layer 20 and the entirety of the second radiation conductor layer 21 are located within the opening Op1 when viewed in the up-down direction. The entirety of the third radiation conductor layer 120 and the entirety of the fourth radiation conductor layer 121 are located within the opening Op11 when viewed in the up-down direction.

The lower floating conductor layer 312 is provided in the multilayer body 12. The lower floating conductor layer 312 is located below the upper floating conductor layer 311. Therefore, the lower floating conductor layer 312 is located on the upper main surface of the insulator layer 14c. The lower floating conductor layer 312 has a rectangular shape when viewed in the up-down direction. The long side of the lower floating conductor layer 312 extends in the left-right direction. The short side of the lower floating conductor layer 312 extends in the front-back direction.

The lower floating conductor layer 312 is provided with openings Op2 and Op12. The openings Op2 and Op12 are arranged in this order from left to right. The openings Op2 and Op12 each have a diamond shape with diagonal lines extending in the front-back direction and the left-right direction. The entirety of the first radiation conductor layer 20 and the entirety of the second radiation conductor layer 21 are located within the opening Op2 when viewed in the up-down direction. The entirety of the third radiation conductor layer 120 and the entirety of the fourth radiation conductor layer 121 are located within the opening Op12 when viewed in the up-down direction. As a result, the first floating conductor 31 has a shape surrounding at least a part of the periphery of the first radiation conductor layer 20 and at least a part of the periphery of the third radiation conductor layer 120 when viewed in the up-down direction. In the present embodiment, the first floating conductor 31 has an annular shape surrounding the periphery of the first radiation conductor layer 20 when viewed in the up-down direction. The first floating conductor 31 has an annular shape surrounding the periphery of the third radiation conductor layer 120 when viewed in the up-down direction.

The interlayer connection conductors v21 to v24 electrically connect the upper floating conductor layer 311 and the lower floating conductor layer 312. Each of the interlayer connection conductors v21 to v24 passes through the insulator layers 14a and 14b in the up-down direction.

The first floating conductor 31 as described above has a floating potential. Therefore, the first floating conductor 31 is not connected to the ground potential or the power supply potential. The high-frequency signals are not transmitted to the first floating conductor 31. Therefore, the first floating conductor 31 is not electrically connected to any of the conductors present in or on the multilayer body 12. The conductors present in or on the multilayer body 12 are, for example, conductor(s) to which the high-frequency signals are transmitted and ground conductor(s) to which the ground potential is connected.

By providing the first floating conductor 31, as shown in FIG. 2, a first waveguide X1 is formed in a region surrounded by the first radiation conductor layer 20, the second radiation conductor layer 21, and the first floating conductor 31. A third waveguide X3 is formed in a region surrounded by the third radiation conductor layer 120, the fourth radiation conductor layer 121, and the first floating conductor 31.

The first ground conductor layer 16, the planar ground conductor layer 18, the first radiation conductor layer 20, the second radiation conductor layer 21, the outer electrodes 24*a*, 24*b*, 26*a*, 26*b*, 124*a*, 124*b*, 126*a*, and 126*b*, the third radiation conductor layer 120, the fourth radiation conductor layer 121, the upper floating conductor layer 311, and the lower floating conductor layer 312 are formed, for example, by patterning a metal foil attached to the upper main surface or the lower main surface of the insulator layers 14*a* to 14*f*. The metal is, for example, copper. The interlayer connection conductors v1 to v8, v11 to v14, and v21 to v24 are, for example, via hole conductors. The via hole conductors are formed by forming through-holes in the insulator layers 14*a* to 14*f*, filling the through-holes with conductive paste, and sintering the conductive paste.

The second floating conductor 32 is not provided in the multilayer body 12. The second floating conductor 32 is located above the multilayer body 12. Thus, the second floating conductor 32 is located above the second radiation conductor layer 21 and the fourth radiation conductor layer 121. A distance L1 between the second floating conductor 32 and the second radiation conductor layer 21 is, for example, ½ or less of the wavelength of the second high-frequency signal. The wavelength of the second high-frequency signal is the wavelength of the second high-frequency signal in air.

The second floating conductor 32 overlaps the multilayer body 12 when viewed in the up-down direction. The second floating conductor 32 has a plate shape having an upper main surface and a lower main surface. The second floating conductor 32 has a rectangular shape when viewed in the up-down direction. The long side of the second floating conductor 32 extends in the left-right direction. The short side of the second floating conductor 32 extends in the front-back direction.

The second floating conductor 32 is provided with openings Op3 and Op13. The openings Op3 and Op13 are arranged in this order from left to right. The openings Op3 and Op13 each have a diamond shape with diagonal lines extending in the front-back direction and the left-right direction. The second radiation conductor layer 21 is located within the opening Op3 when viewed in the up-down direction. The fourth radiation conductor layer 121 is located within the opening Op13 when viewed in the up-down direction. Thus, the second floating conductor 32 has a shape surrounding at least a part of the periphery of the second radiation conductor layer 21 and at least a part of the periphery of the fourth radiation conductor layer 121 when viewed in the up-down direction. In the present embodiment, the second floating conductor 32 has an annular shape surrounding the periphery of the second radiation conductor layer 21 when viewed in the up-down direction. The second floating conductor 32 has an annular shape surrounding the periphery of the fourth radiation conductor layer 121 when viewed in the up-down direction.

The first radiation conductor layer 20 is located within the opening Op3 when viewed in the up-down direction. The third radiation conductor layer 120 is located within the opening Op13 when viewed in the up-down direction. Thus, the second floating conductor 32 has a shape surrounding at least a part of the periphery of the first radiation conductor layer 20 and at least a part of the periphery of the third radiation conductor layer 120 when viewed in the up-down direction. In the present embodiment, the second floating conductor 32 has an annular shape surrounding the periphery of the first radiation conductor layer 20 when viewed in the up-down direction. The second floating conductor 32 has an annular shape surrounding the periphery of the third radiation conductor layer 120 when viewed in the up-down direction.

As shown in FIG. 3, when viewed in the up-down direction, the openings Op1 and Op2 surrounded by the first floating conductor 31 are contained in the opening Op3 surrounded by the second floating conductor 32. When viewed in the up-down direction, the openings Op11 and Op12 surrounded by the first floating conductor 31 are contained in the opening Op13 surrounded by the second floating conductor 32.

The second floating conductor 32 as described above has a floating potential. Therefore, the second floating conductor 32 is not connected to the ground potential or the power supply potential. The high-frequency signals are not transmitted to the second floating conductor 32. Therefore, the second floating conductor 32 is not electrically connected to any of the conductors present in or on the multilayer body 12. The conductors present in or on the multilayer body 12 are, for example, conductor(s) to which the high-frequency signals are transmitted and ground conductor(s) to which the ground potential is connected.

The second floating conductor 32 is a metal plate. The metal is, for example, SUS (steel use stainless), copper, or the like. In the present embodiment, the second floating conductor 32 is bonded to a glass plate (not shown) with an adhesive.

By providing the second floating conductor 32, as shown in FIG. 2, a second waveguide X2 is formed in a region surrounded by the second radiation conductor layer 21 and the first floating conductor 31. A fourth waveguide X4 is formed in a region surrounded by the fourth radiation conductor layer 121 and the first floating conductor 31.

Each of the first waveguide X1, the second waveguide X2, the third waveguide X3, and the fourth waveguide X4 has a cutoff frequency. The cutoff frequency is an upper limit of the band of each of the high-frequency signals that can pass through the first waveguide X1, the second waveguide X2, the third waveguide X3, and the fourth waveguide X4. The cutoff frequency of the first waveguide X1 is lower than the frequency of the first high-frequency signal. The cutoff frequency of the second waveguide X2 is lower than the frequency of the first high-frequency signal and the frequency of the second high-frequency signal. The cutoff frequency of the third waveguide X3 is lower than the frequency of the third high-frequency signal. The cutoff frequency of the fourth waveguide X4 is lower than the frequency of the third high-frequency signal and the frequency of the fourth high-frequency signal.

The cutoff frequencies of the first waveguide X1, the second waveguide X2, the third waveguide X3, and the fourth waveguide X4 depend on the sizes of the openings Op1, Op3, Op11, and Op13, respectively. Therefore, the sizes of the opening Op1 in the front-back direction and the left-right direction are each longer than half of the wavelength of the first high-frequency signal. The sizes of the opening Op3 in the front-back direction and the left-right direction are each longer than half of the wavelength of the first high-frequency signal and half of the wavelength of the second high-frequency signal. The sizes of the opening Op11 in the front-back direction and the left-right direction are each longer than half of the wavelength of the third high-frequency signal. The sizes of the opening Op13 in the front-back direction and the left-right direction are each longer than half of the wavelength of the third high-frequency signal and half of the wavelength of the fourth high-frequency signal. In the present embodiment, the sizes of the openings Op1, Op3, Op11, and Op13 in the front-back direction and in the left-right direction are 0.45 mm.

In the electronic device 1 as described above, the first ground conductor layer 16, the planar ground conductor layer 18, and the first radiation conductor layer 20 function as a patch antenna that radiates or receives the first high-frequency signal. The first ground conductor layer 16, the planar ground conductor layer 18, and the second radiation conductor layer 21 function as a patch antenna that radiates or receives the second high-frequency signal. The first ground conductor layer 16, the planar ground conductor layer 18, and the third radiation conductor layer 120 function as a patch antenna that radiates or receives the third high-frequency signal. The first ground conductor layer 16, the planar ground conductor layer 18, and the fourth radiation conductor layer 121 function as a patch antenna that radiates or receives the fourth high-frequency signal.

Effects

With the electronic device 1, the directivity of each of the first radiation conductor layer 20 and the second radiation conductor layer 21 can be improved. More specifically, the first floating conductor 31 has a shape surrounding at least a part of the periphery of the first radiation conductor layer 20 when viewed in the up-down direction. The first floating conductor 31 is located on the same layer as or above the first radiation conductor layer 20 and on the same layer as or below the second radiation conductor layer 21 in the up-down direction. Further, the first floating conductor 31 is not electrically connected to any of the conductors present in or on the multilayer body 12. Thus, the first waveguide X1 is formed in a region surrounded by the first radiation conductor layer 20, the second radiation conductor layer 21, and the first floating conductor 31. Such a first waveguide X1 restricts the first high-frequency signal radiated by the first radiation conductor layer 20 from spreading excessively in the front-back direction and the left-right direction. Further, the first waveguide X1 regulates the passing area of the first high-frequency signal possible to be received by the first radiation conductor layer 20. That is, the first waveguide X1 improves the directivity of the first radiation conductor layer 20.

The second floating conductor 32 has a shape surrounding at least a part of the periphery of the second radiation conductor layer 21 when viewed in the up-down direction. The second floating conductor 32 is located above the second radiation conductor layer 21. Thus, the second waveguide X2 is formed in a region surrounded by the second radiation conductor layer 21 and the first floating conductor 32. Such a second waveguide X2 restricts the second high-frequency signal radiated by the second radiation conductor layer 21 from spreading excessively in the front-back direction and the left-right direction. Further, the second waveguide X2 regulates the passing area of the second high-frequency signal possible to be received by the second radiation conductor layer 21. That is, the second waveguide X2 improves the directivity of the second radiation conductor layer 21. For the same reason, the directivity of the third radiation conductor layer 120 and the directivity of the fourth radiation conductor layer 121 are improved.

With the electronic device 1, the increase in size of the electronic device 1 is suppressed. The second radiation conductor layer 21 overlaps the first radiation conductor layer 20 when viewed in the up-down direction. Thus, when viewed in the up-down direction, the electronic device 1 is less likely to become larger than an electronic device in which two radiation conductors are arranged in the front-back direction or the left-right direction.

According to the electronic device 1, the first floating conductor 31 has an annular shape surrounding the periphery of the first radiation conductor layer 20 when viewed in the up-down direction. Thus, the directivity of the first radiation conductor layer 20 is further improved. For the same reason, the directivity of the second radiation conductor layer 21, the directivity of the third radiation conductor layer 120, and the directivity of the fourth radiation conductor layer 121 are improved.

According to the electronic device 1, when viewed in the up-down direction, the opening Op1 surrounded by the first floating conductor 31 is contained in the opening Op3 surrounded by the second floating conductor 32. Therefore, the area of the opening Op3 is larger than the area of the opening Op1. Thus, the first high-frequency signal radiated by the first radiation conductor layer 20 is less likely to be inhibited by the second floating conductor 32. The reception of the first high-frequency signal by the first radiation conductor layer 20 is less likely to be inhibited by the second floating conductor 32. Therefore, the directivity of the first radiation conductor layer 20 depends on the shape of the opening Op1 and is less likely to depend on the shape of the opening Op3. For the same reason, the directivity of the fourth radiation conductor layer 121 depends on the shape of the opening Op11 and is less likely to depend on the shape of the opening Op13.

With the electronic device 1, the antenna gain of the first radiation conductor layer 20 in a first polarized wave and the antenna gain of the first radiation conductor layer 20 in a second polarized wave can be close to each other. More specifically, the first radiation conductor layer 20 radiates and receives the first high-frequency signal of the first polarized wave at the first power feeding point P1. The first radiation conductor layer 20 radiates and receives the first high-frequency signal of the second polarized wave at the second power feeding point P2. In order to make the antenna gain of the first radiation conductor layer 20 in the first polarized wave and the antenna gain of the first radiation conductor layer 20 in the second polarized wave close to each other, the distance from the first power feeding point P1 to the first ground conductor layer 16 and the distance from the second power feeding point P2 to the first ground conductor layer 16 may be made close to each other.

Therefore, in the electronic device 1, as shown in FIG. 3, the first radiation conductor layer 20 and the second radiation conductor layer 21 each have a diamond shape with diagonal lines extending in the left-right direction and the front-back direction when viewed in the up-down direction. Further, the first ground conductor layer 16 is located to the left, in front of, and behind the first radiation conductor layer 20 and the second radiation conductor layer 21 when viewed in the up-down direction. Thus, the distance from the first power feeding point P1 to the first ground conductor layer 16 and the distance from the second power feeding point P2 to the first ground conductor layer 16 are equal to each other. As a result, with the multilayer substrate 10, the antenna gain of the first radiation conductor layer 20 in the first polarized wave and the antenna gain of the first radiation conductor layer 20 in the second polarized wave can be made close to each other. For the same reason, with the multilayer substrate 10, the antenna gain of the second radiation conductor layer 21 in the first polarized wave and the antenna gain of the second radiation conductor layer 21 in the second polarized wave can be made close to each other.

According to the electronic device 1, air is present between the multilayer body 12 and the second floating conductor 32. Thus, the dielectric constant of the space above the first radiation conductor layer 20, the second radiation conductor layer 21, the third radiation conductor layer 120, and the fourth radiation conductor layer 121 becomes low. As a result, the dielectric loss generated in the electronic device 1 is reduced.

First Variation

Figure 4:
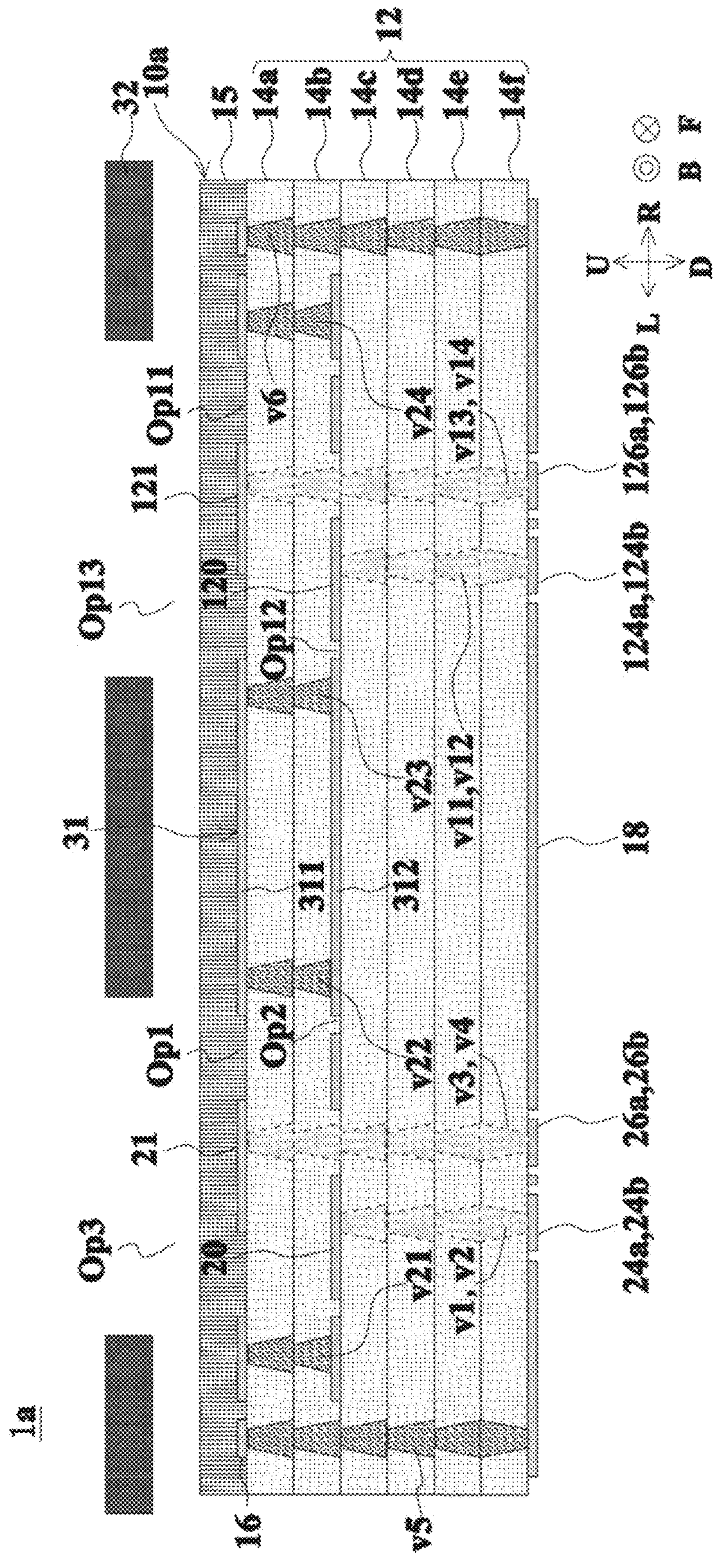
FIG. 4 is a cross-sectional view of an electronic device 1*a*.

An electronic device 1*a* according to a first variation will be described below with reference to the drawings. FIG. 4 is a cross-sectional view of the electronic device 1*a*.

The electronic device 1*a* differs from the electronic device 1 in that a multilayer substrate 10*a* further includes a protective layer 15. The protective layer 15 has a dielectric constant higher than a dielectric constant of the insulator layers 14*a* to 14*f*. The protective layer 15 covers the upper surface of the multilayer body 12. No conductor layer is located on the upper surface of the protective layer 15. Such a protective layer 15 protects the conductor layers located on the upper main surface of the insulator layer 14*a*. The other structures of the electronic device 1*a* are the same as those of the electronic device 1, and therefore the description thereof is omitted. The electronic device 1*a* can achieve the same effects as those of the electronic device 1.

With the electronic device 1*a*, since the protective layer 15 has a high dielectric constant, a wavelength shortening effect is caused in the second waveguide X2. As a result, the cutoff frequency of the second waveguide X2 increases. Thus, the cutoff frequency of the second waveguide X2 can be adjusted by providing the protective layer 15. For the same reason, the cutoff frequency of the fourth waveguide X4 can be adjusted by providing the protective layer 15.

Second Variation

Figure 5:
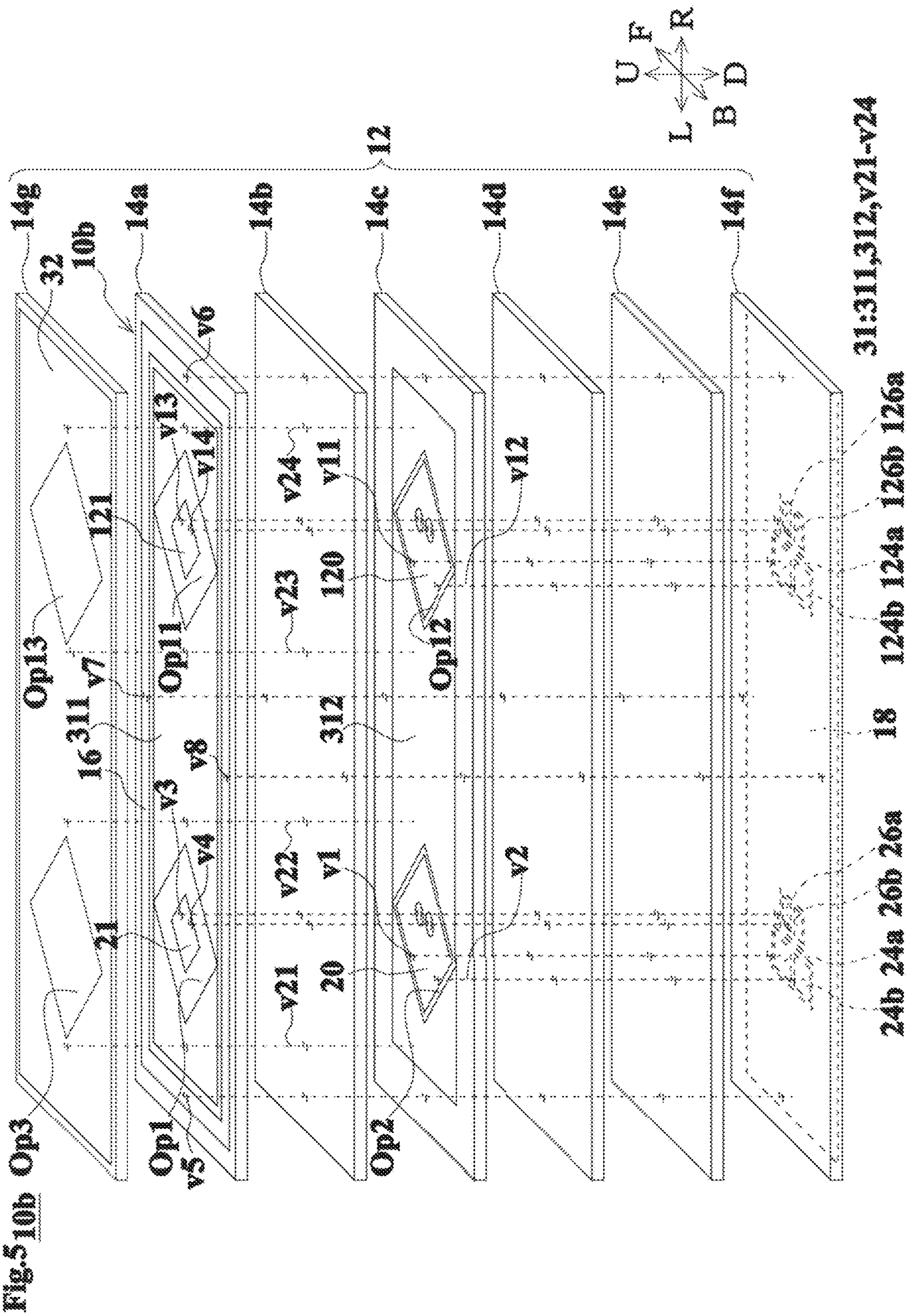
FIG. 5 is an exploded perspective view of a multilayer substrate 10*b*.

A multilayer substrate 10*b* according to a second variation will be described below with reference to the drawings. FIG. 5 is an exploded perspective view of the multilayer substrate 10*b*.

The multilayer substrate 10*b* differs from the multilayer substrate 10 in that the multilayer substrate 10*b* includes a second floating conductor 32. More specifically, the multilayer body 12 further includes an insulator layer 14*g*. The insulator layer 14*g* is located above the insulator layer 14*a*.

The second floating conductor 32 is located on the upper main surface of the insulator layer 14*g*. The second floating conductor 32 is a conductor layer. Therefore, the second floating conductor 32 of the multilayer substrate 10*b* is different from the second floating conductor 32 of the electronic device 1 in thickness. However, the structure of the second floating conductor 32 of the multilayer substrate 10*b* is the same as that of the second floating conductor 32 of the electronic device 1 except for the thickness.

Interlayer connection conductors v21 to v24 pass through the insulator layers 14*g*, 14*a*, and 14*b* in the up-down direction. Thus, the second floating conductor 32 is electrically connected to the first floating conductor 31 by the interlayer connection conductors v21 to v24. The other structures of the multilayer substrate 10*b* are the same as those of the electronic device 1, and therefore the description thereof is omitted. The multilayer substrate 10*b* can achieve the same effects as those of the electronic device 1. Further, since the multilayer substrate 10*b* is provided with the second floating conductor 32, reduction in size is achieved as compared with the electronic device 1.

Third Variation

Figure 6:
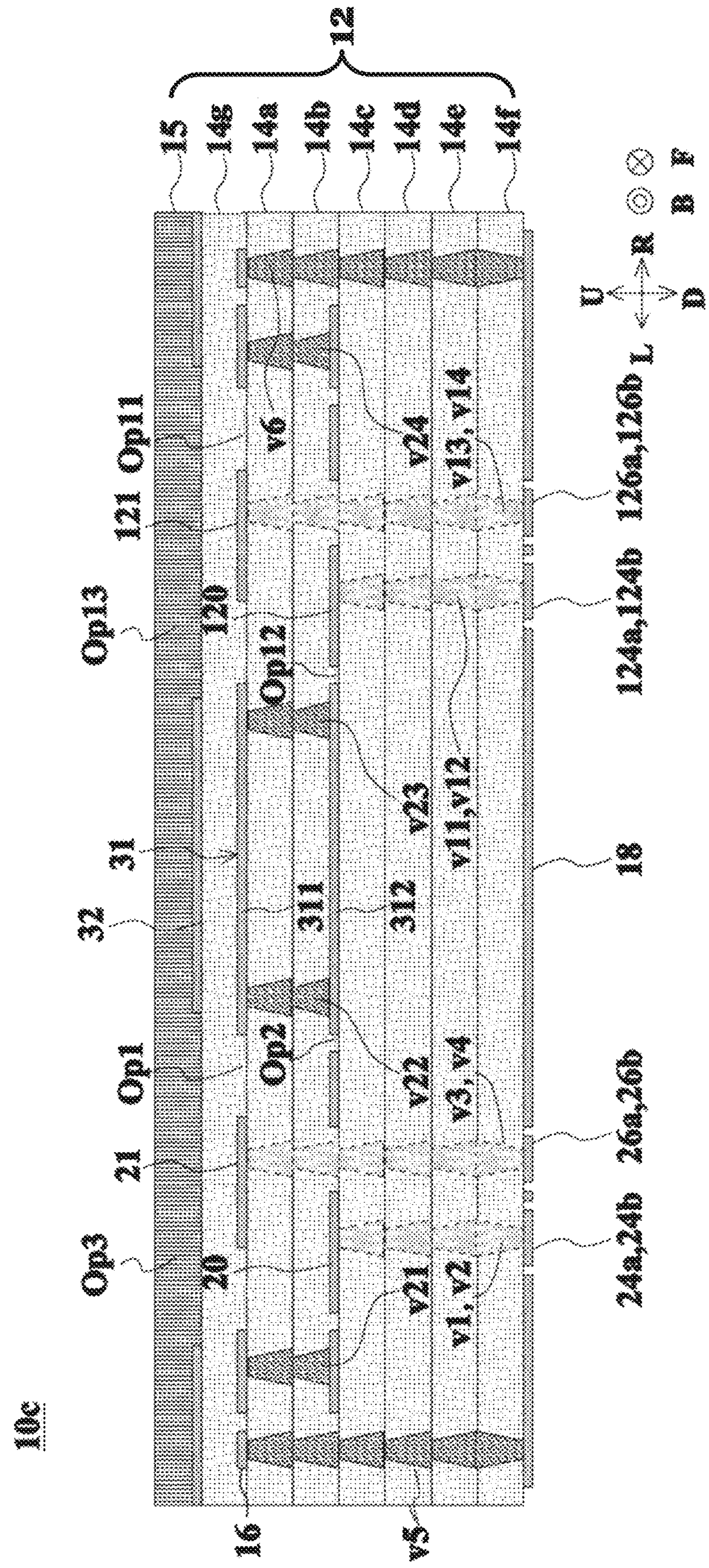
FIG. 6 is a cross-sectional view of a multilayer substrate 10*c*.

A multilayer substrate 10*c* according to a third variation will be described below with reference to the drawings. FIG. 6 is a cross-sectional view of the multilayer substrate 10*c*.

The multilayer substrate 10*c* differs from the multilayer substrate 10*b* in that it further includes a protective layer 15. The protective layer 15 has a dielectric constant higher than a dielectric constant of the insulator layers 14*a* to 14*g*. The protective layer 15 covers the upper surface of the multilayer body 12. No conductor layer is located on the upper surface of the protective layer 15. Such a protective layer 15 protects the conductor layer located on the upper main surface of the insulator layer 14*g*. The other structures of the multilayer substrate 10*c* are the same as those of the multilayer substrate 10*b*, and therefore the description thereof is omitted. The multilayer substrate 10*c* can achieve the same effects as those of the multilayer substrate 10*b*.

With the multilayer substrate 10*c*, since the protective layer 15 has a high dielectric constant, a wavelength shortening effect is caused in the second waveguide X2. As a result, the cutoff frequency of the second waveguide X2 increases. Thus, the cutoff frequency of the second waveguide X2 can be adjusted by providing the protective layer 15. For the same reason, the cutoff frequency of the fourth waveguide X4 can be adjusted by providing the protective layer 15.

Other Embodiments

The electronic device according to the present disclosure is not limited to the electronic devices 1 and 1*a* but can be modified within the scope of its gist. The structures of the electronic devices 1 and 1*a* may be combined as desired.

The multilayer substrate according to the present disclosure is not limited to the multilayer substrates 10*b* and 10*c* but can be modified within the scope of its gist. The structures of the multilayer substrates 10*b* and 10*c* may be combined as desired.

The third radiation conductor layer 120 and the fourth radiation conductor layer 121 are not essential components.

It is possible that either of the following is satisfied: the frequency of the electromagnetic wave radiated or received by the second radiation conductor layer 21 is higher than the frequency of the electromagnetic wave radiated or received by the first radiation conductor layer 20, or the area of the second radiation conductor layer 21 is smaller than the area of the first radiation conductor layer 20.

It is possible that either of the following is satisfied: the frequency of the electromagnetic wave radiated or received by the fourth radiation conductor layer 121 is higher than the frequency of the electromagnetic wave radiated or received by the third radiation conductor layer 120, or the area of the fourth radiation conductor layer 121 is smaller than the area of the third radiation conductor layer 120.

It is possible that only one of the interlayer connection conductors v1 and v2 is provided. It is possible that only one of the interlayer connection conductors v3 and v4 is provided.

Also, it is possible that only the interlayer connection conductor v1 is provided. In such a case, the interlayer connection conductor v1 is connected to both the first radiation conductor layer 20 and the second radiation conductor layer 21 and is connected to the outer electrode 24*a*.

Both the first high-frequency signal and the second high-frequency signal are input and output to and from the outer electrode 24_a_. When the first radiation conductor layer 20 receives the first high-frequency signal and the second radiation conductor layer 21 receives the second high-frequency signal, for example, a duplexer is connected to the outer electrode 24_a_. The duplexer isolates the first high-frequency signal and the second high-frequency signal from each other.

It is possible that the first ground conductor layer 16 does not have an annular shape.

The first ground conductor layer 16 and the planar ground conductor layer 18 are not essential components.

It is possible that the first floating conductor 31 does not have an annular shape surrounding the periphery of the first radiation conductor layer 20 when viewed in the up-down direction. It is sufficient that the first floating conductor 31 has a shape surrounding at least a part of the periphery of the first radiation conductor layer 20 when viewed in the up-down direction.

It is possible that the first floating conductor 31 does not have an annular shape surrounding the periphery of the third radiation conductor layer 120 when viewed in the up-down direction. It is sufficient that the first floating conductor 31 has a shape surrounding at least a part of the periphery of the third radiation conductor layer 120 when viewed in the up-down direction.

It is possible that the second floating conductor 32 does not have an annular shape surrounding the periphery of the second radiation conductor layer 21 when viewed in the up-down direction. It is sufficient that the second floating conductor 32 has a shape surrounding at least a part of the periphery of the second radiation conductor layer 21 when viewed in the up-down direction.

It is possible that the second floating conductor 32 does not have an annular shape surrounding the periphery of the fourth radiation conductor layer 121 when viewed in the up-down direction. It is sufficient that the second floating conductor 32 has a shape surrounding at least a part of the periphery of the fourth radiation conductor layer 121 when viewed in the up-down direction.

It is possible that the opening Op2 surrounded by the first floating conductor 31 is not contained in the opening Op3 surrounded by the second floating conductor 32 when viewed in the up-down direction.

It is possible that the first radiation conductor layer 20 and the second radiation conductor layer 21 each have a shape other than a diamond shape with diagonal lines extending in the front-back direction and the left-right direction when viewed in the up-down direction. It is possible that the first radiation conductor layer 20 and the second radiation conductor layer 21 have a circular shape when viewed in the up-down direction.

It is possible that the first floating conductor 31 does not include an interlayer connection conductor. In such a case, the first floating conductor 31 is, for example, a single conductor layer.

It is possible that, in the multilayer substrates 10_b_ and 10_c_, the first floating conductor 31 and the second floating conductor 32 are not electrically connected to each other.

The number of the interlayer connection conductors for electrically connecting the upper floating conductor layer 311 and the lower floating conductor layer 312 is not limited to four. The number of the interlayer connection conductors for electrically connecting the upper floating conductor layer 311 and the lower floating conductor layer 312 may be one or more.

The interlayer connection conductors v21 to v24 pass through the insulator layers 14_a_ and 14_b_ in the up-down direction; however, it is also possible that the interlayer connection conductors v21 to v24 pass through one or more insulator layers in the up-down direction.

The frequency of the first high-frequency signal, the frequency of the second high-frequency signal, the frequency of the third high-frequency signal, and the frequency of the fourth high-frequency signal are different from each other. However, it is also possible that the frequency of the first high-frequency signal is equal to the frequency of the third high-frequency signal, and the frequency of the second high-frequency signal is equal to the frequency of the fourth high-frequency signal.

The present disclosure has the following structure.

(1)

An electronic device comprising:
a multilayer substrate; and
a second floating conductor,
wherein the multilayer substrate comprises:
- a multilayer body having a structure stacked in an up-down direction;
- a first radiation conductor layer provided in the multilayer body;
- a second radiation conductor layer that is provided in or on the multilayer body, that is located above the first radiation conductor layer, and that overlaps the first radiation conductor layer when viewed in the up-down direction; and
- a first floating conductor that has a shape surrounding at least a part of a periphery of the first radiation conductor layer when viewed in the up-down direction, that is located on a same layer as or above the first radiation conductor layer and on a same layer as or below the second radiation conductor layer in the up-down direction, and that is not electrically connected to any conductor present in or on the multilayer body, and wherein the second floating conductor is not electrically connected to any conductor present in or on the multilayer body, has a shape surrounding at least a part of a periphery of the second radiation conductor layer when viewed in the up-down direction, and is located above the second radiation conductor layer.

(2)

The electronic device according to (1), wherein a frequency of an electromagnetic wave radiated or received by the second radiation conductor layer is higher than a frequency of an electromagnetic wave radiated or received by the first radiation conductor layer; or an area of the second radiation conductor layer is smaller than an area of the first radiation conductor layer.

(3)

The electronic device according to (1) or (2), wherein the first floating conductor has an annular shape surrounding the periphery of the first radiation conductor layer when viewed in the up-down direction.

(4)

The electronic device according to (3), wherein the second floating conductor has an annular shape surrounding the periphery of the second radiation conductor layer when viewed in the up-down direction.

(5)

The electronic device according to (4), wherein an opening surrounded by the first floating conductor is contained in an opening surrounded by the second floating conductor when viewed in the up-down direction.

(6)

The electronic device according to any one of (1) to (5), further comprising:

a third radiation conductor layer provided in the multilayer body; and a fourth radiation conductor layer that is provided in or on the multilayer body, that is located above the third radiation conductor layer, and that overlaps the third radiation conductor layer when viewed in the up-down direction, wherein the first floating conductor has a shape surrounding at least a part of the third radiation conductor layer when viewed in the up-down direction, and the second floating conductor has a shape surrounding at least a part of the fourth radiation conductor layer when viewed in the up-down direction.

(7)

The electronic device according to any one of (1) to (6), wherein the first radiation conductor layer and the second radiation conductor layer each have a diamond shape with diagonal lines extending in a front-back direction and a left-right direction when viewed in the up-down direction.

(8)

The electronic device according to any one of (1) to (7), wherein the first floating conductor includes one or more interlayer connection conductors passing through one or more of the insulator layers in the up-down direction.

(9)

The electronic device according to (8), wherein the first floating conductor includes an upper floating conductor layer located on an upper surface of the multilayer body and a lower floating conductor layer located below the upper floating conductor layer, and the one or more interlayer connection conductors electrically connect the upper floating conductor layer and the lower floating conductor layer.

(10)

The electronic device according to any one of (1) to (9), wherein the multilayer substrate further comprises a protective layer that has a dielectric constant higher than a dielectric constant of the insulator layers and that covers an upper surface of the multilayer body, and no conductor layer is located on an upper surface of the protective layer.

(11)

A multilayer substrate comprising:

a multilayer body having a structure stacked in an up-down direction;

a first radiation conductor layer provided in the multilayer body;

a second radiation conductor layer that is provided in or on the multilayer body, that is located above the first radiation conductor layer, and that overlaps the first radiation conductor layer when viewed in the up-down direction;

a first floating conductor that has a shape surrounding at least a part of the first radiation conductor layer when viewed in the up-down direction, that is located on a same layer as or above the first radiation conductor layer and on a same layer as or below the second radiation conductor layer in the up-down direction, and that is not electrically connected to any conductor present in or on the multilayer body; and a second floating conductor that has a shape surrounding at least a part of the second radiation conductor layer when viewed in the up-down direction, that is located above the second radiation conductor layer, and that is not electrically connected to any conductor present in or on the multilayer body.

(12)

The multilayer substrate according to (11), wherein a frequency of an electromagnetic wave radiated or received by the second radiation conductor layer is higher than a frequency of an electromagnetic wave radiated or received by the first radiation conductor layer; or an area of the second radiation conductor layer is smaller than an area of the first radiation conductor layer.

(13)

The multilayer substrate according to (11) or (12), wherein the first floating conductor has an annular shape surrounding a periphery of the first radiation conductor layer when viewed in the up-down direction.

(14)

The multilayer substrate according to (13), wherein the second floating conductor has an annular shape surrounding a periphery of the second radiation conductor layer when viewed in the up-down direction.

(15)

The multilayer substrate according to (14), wherein an opening surrounded by the first floating conductor is contained in an opening surrounded by the second floating conductor when viewed in the up-down direction.

(16)

The multilayer substrate according to any one of (11) to (15), further comprising:

a third radiation conductor layer provided in the multilayer body; and a fourth radiation conductor layer that is provided in or on the multilayer body, that is located above the third radiation conductor layer, and that overlaps the third radiation conductor layer when viewed in the up-down direction, wherein the first floating conductor has a shape surrounding at least a part of the third radiation conductor layer when viewed in the up-down direction, and the second floating conductor has a shape surrounding at least a part of the fourth radiation conductor layer when viewed in the up-down direction.

(17)

The multilayer substrate according to any one of (11) to (16), wherein the first radiation conductor layer and the second radiation conductor layer each have a diamond shape with diagonal lines extending in a front-back direction and a left-right direction.

(18)

The multilayer substrate according to any one of (11) to (17), wherein the first floating conductor includes one or more interlayer connection conductors passing through one or more of the insulator layers in the up-down direction.

(19)

The multilayer substrate according to (18), wherein the first floating conductor includes an upper floating conductor layer located on an upper surface of the multilayer body and a lower floating conductor layer located below the upper floating conductor layer, and the one or more interlayer connection conductors electrically connect the upper floating conductor layer and the lower floating conductor layer.

(20)

The multilayer substrate according to any one of (11) to (19), further comprising:

a protective layer that has a dielectric constant higher than a dielectric constant of the insulator layers and that covers an upper surface of the multilayer body, wherein no conductor layer is located on an upper surface of the protective layer.

(21)

The multilayer substrate according to any one of (11) to (20), wherein the second floating conductor is electrically connected to the first floating conductor.

REFERENCE SIGNS LIST

1, 1*a* electronic device
10, 10*a* to 10*c* multilayer substrate
12 multilayer body
14*a* to 14*g* insulator layer
15 protective layer
16 first ground conductor layer
18 planar ground conductor layer
20 first radiation conductor layer
21 second radiation conductor layer
24*a*, 24*b*, 26*a*, 26*b*, 124*a*, 124*b*, 126*a*, 126*b* outer electrode
31 first floating conductor
32 second floating conductor
120 third radiation conductor layer
121 fourth radiation conductor layer
311 upper floating conductor layer
312 lower floating conductor layer
Op1 to Op3, Op11 to Op13 opening
P1 first power feeding point
P2 second power feeding point
P3 third power feeding point
P4 fourth power feeding point
P5 fifth power feeding point
P6 sixth power feeding point
P7 seventh power feeding point
P8 eighth power feeding point
X1 first waveguide
X2 second waveguide
X3 third waveguide
X4 fourth waveguide
v1 to v8, v11 to v14, v21 to v24 interlayer connection conductor

The invention claimed is:

1. An electronic device comprising:

a multilayer substrate; and a second floating conductor, wherein the multilayer substrate comprises:

a multilayer body having a structure in which a plurality of insulator layers is stacked in an up-down direction;

a first radiation conductor layer provided in the multilayer body;

a second radiation conductor layer that is provided in or on the multilayer body, that is located above the first radiation conductor layer, and that overlaps the first radiation conductor layer when viewed in the up-down direction; and a first floating conductor that has a shape surrounding at least a part of a periphery of the first radiation conductor layer when viewed in the up-down direction, that is located on a same layer as or above the first radiation conductor layer and on a same layer as or below the second radiation conductor layer in the up-down direction, and that is not electrically connected to any conductor present in or on the multilayer body, and wherein the second floating conductor is not electrically connected to any conductor present in or on the multilayer body, has a shape surrounding at least a part of a periphery of the second radiation conductor layer when viewed in the up-down direction, and is located above the second radiation conductor layer.

2. The electronic device according to claim 1, wherein a frequency of an electromagnetic wave radiated or received by the second radiation conductor layer is higher than a frequency of an electromagnetic wave radiated or received by the first radiation conductor layer; or an area of the second radiation conductor layer is smaller than an area of the first radiation conductor layer.

3. The electronic device according to claim 2, wherein the first floating conductor has an annular shape surrounding the periphery of the first radiation conductor layer when viewed in the up-down direction.

4. The electronic device according to claim 3, wherein the second floating conductor has an annular shape surrounding the periphery of the second radiation conductor layer when viewed in the up-down direction.

5. The electronic device according to claim 4, wherein an opening surrounded by the first floating conductor is contained in an opening surrounded by the second floating conductor when viewed in the up-down direction.

6. The electronic device according to claim 5, further comprising:

a third radiation conductor layer provided in the multilayer body; and a fourth radiation conductor layer that is provided in or on the multilayer body, that is located above the third radiation conductor layer, and that overlaps the third radiation conductor layer when viewed in the up-down direction, wherein the first floating conductor has a shape surrounding at least a part of the third radiation conductor layer when viewed in the up-down direction, and the second floating conductor has a shape surrounding at least a part of the fourth radiation conductor layer when viewed in the up-down direction.

7. The electronic device according to claim 6, wherein the first radiation conductor layer and the second radiation conductor layer each have a diamond shape with diagonal lines extending in a front-back direction and a left-right direction when viewed in the up-down direction.

8. The electronic device according to claim 7, wherein the first floating conductor includes one or more interlayer connection conductors passing through one or more of the insulator layers in the up-down direction.

9. The electronic device according to claim 8, wherein the first floating conductor includes an upper floating conductor layer located on an upper surface of the multilayer body and a lower floating conductor layer located below the upper floating conductor layer, and the one or more interlayer connection conductors electrically connect the upper floating conductor layer and the lower floating conductor layer.

10. The electronic device according to claim 9, wherein the multilayer substrate further comprises a protective layer that has a dielectric constant higher than a dielectric constant of the insulator layers and that covers an upper surface of the multilayer body, and no conductor layer is located on an upper surface of the protective layer.

11. A multilayer substrate comprising:

a multilayer body having a structure in which a plurality of insulator layers is stacked in an up-down direction;

a first radiation conductor layer provided in the multilayer body;

a second radiation conductor layer that is provided in or on the multilayer body, that is located above the first radiation conductor layer, and that overlaps the first radiation conductor layer when viewed in the up-down direction;

a first floating conductor that has a shape surrounding at least a part of the first radiation conductor layer when viewed in the up-down direction, that is located on a same layer as or above the first radiation conductor layer and on a same layer as or below the second radiation conductor layer in the up-down direction, and that is not electrically connected to any conductor present in or on the multilayer body; and a second floating conductor that has a shape surrounding at least a part of the second radiation conductor layer when viewed in the up-down direction, that is located above the second radiation conductor layer, and that is not electrically connected to any conductor present in or on the multilayer body.

12. The multilayer substrate according to claim 11, wherein a frequency of an electromagnetic wave radiated or received by the second radiation conductor layer is higher than a frequency of an electromagnetic wave radiated or received by the first radiation conductor layer; or an area of the second radiation conductor layer is smaller than an area of the first radiation conductor layer.

13. The multilayer substrate according to claim 12, wherein the first floating conductor has an annular shape surrounding a periphery of the first radiation conductor layer when viewed in the up-down direction.

14. The multilayer substrate according to claim 13, wherein the second floating conductor has an annular shape surrounding a periphery of the second radiation conductor layer when viewed in the up-down direction.

15. The multilayer substrate according to claim 14, wherein an opening surrounded by the first floating conductor is contained in an opening surrounded by the second floating conductor when viewed in the up-down direction.

16. The multilayer substrate according to claim 15, further comprising:

a third radiation conductor layer provided in the multilayer body; and a fourth radiation conductor layer that is provided in or on the multilayer body, that is located above the third radiation conductor layer, and that overlaps the third radiation conductor layer when viewed in the up-down direction, wherein the first floating conductor has a shape surrounding at least a part of the third radiation conductor layer when viewed in the up-down direction, and the second floating conductor has a shape surrounding at least a part of the fourth radiation conductor layer when viewed in the up-down direction.

17. The multilayer substrate according to claim 16, wherein the first radiation conductor layer and the second radiation conductor layer each have a diamond shape with diagonal lines extending in a front-back direction and a left-right direction.

18. The multilayer substrate according to claim 17, wherein the first floating conductor includes one or more interlayer connection conductors passing through one or more of the insulator layers in the up-down direction.

19. The multilayer substrate according to claim 18, wherein the first floating conductor includes an upper floating conductor layer located on an upper surface of the multilayer body and a lower floating conductor layer located below the upper floating conductor layer, and the one or more interlayer connection conductors electrically connect the upper floating conductor layer and the lower floating conductor layer.

20. The multilayer substrate according to claim 19, further comprising:

a protective layer that has a dielectric constant higher than a dielectric constant of the insulator layers and that covers an upper surface of the multilayer body, wherein no conductor layer is located on an upper surface of the protective layer, and the second floating conductor is electrically connected to the first floating conductor.

* * * * *